United States Patent [19]
Coronel

[11] 4,358,077
[45] Nov. 9, 1982

[54] TRANSVERSE WING ACTUATION SYSTEM

[76] Inventor: Paul K. Coronel, P.O. Box 134, Kailua-Kona, Hi. 96740

[21] Appl. No.: 160,121

[22] Filed: Jun. 16, 1980

[51] Int. Cl.³ .......................... B64B 3/54; B64B 3/44
[52] U.S. Cl. ..................... 244/218; 244/46; 244/219
[58] Field of Search ............... 244/215–219, 244/45–48

[56] References Cited

U.S. PATENT DOCUMENTS

| | | | |
|---|---|---|---|
| 1,589,780 | 6/1926 | Wragg | 244/48 |
| 2,783,956 | 3/1957 | Harriss | 244/48 |
| 3,259,342 | 7/1966 | Kessery | 244/45 R |
| 3,463,108 | 8/1969 | Neumeier | 244/47 |
| 4,235,400 | 11/1980 | Haworth | 244/218 |

FOREIGN PATENT DOCUMENTS

| | | | |
|---|---|---|---|
| 93610 | 6/1962 | Denmark | 244/218 |
| 2353245 | 4/1975 | Fed. Rep. of Germany | 244/218 |
| 846053 | 9/1939 | France | 244/47 |

*Primary Examiner*—Galen L. Barefoot

[57] ABSTRACT

An aircraft sustentation system is disclosed which consists of one pair of fixed swept primary wings attached to the fuselage of the aircraft, and one pair of pivotal swept transverse wings attached to the fuselage of the aircraft in a manner where all leading edges, trailing edges, and lateral angles of both sets of wings are parallel or exceed a parallel relationship to each other, the pivotal transverse wings possessing transverse wing collars capable of accepting accessory and/or landing gear supports or wells; and the pivotal transverse wings utilizing actuation mechanisms capable of canting, laterally tilting, and variable sweeping the transverse wings in a manner where the swept transverse wing leading edges approach or contact the trailing edge of the primary wing or primary wing flap with a parallel relationship during the low-speed high-lift configuration.

2 Claims, 7 Drawing Figures

TRANSVERSE WING ACTUATION SYSTEM

BACKGROUND OF THE INVENTION

1. Field of the Invention

The present invention relates to aircraft transverse wing pivoting, tilting, and positioning mechanisms in general, and, in particular to rearward swept pivotal transverse wings having particular features adapted so as to achieve tilting with dehedral angles to allow the leading edge of the tilted transverse wind meet with the trailing edge of the swept primary wing or primary wing flap during low speed, high-lift flight, and to allow the transverse wing to return to a parallel relationship with the primary wing without dehedral angles during high-speed flight, and to provide transverse wing collars to obtain necessary clearance between the canted, tilted, and forward variable swept position and the aircraft fuselage during the high-lift configuration.

2. Description of the Prior Art

The use of pivotal transverse wings with dehedral angles inherent in the positioning of of two independent sets of high-speed airfoils relative to the fuselage of an aircraft represents very recent improvements in the state of the art. In Coronel, Airplane, Ser. No. 049,277 (1979) (now abandoned) FIGS. 7 and 8; an aircraft possessing pivotal swept transverse wings with dehedral angles is described. The dehedral angles incorporated in the transverse wings and/or primary wings as depicted are necessary for the unpivoted set of high-speed transverse wings to be pivoted in a manner which will facilitate the meeting of the leading edge of the transverse with the trailing edge of the primary wing or lowered primary wing flap.

SUMMARY OF THE INVENTION

The present invention is summarized in that a rearwardly swept transverse wing system consisting of a pair of swept fixed primary wings attached to the fuselage and extending outward therefrom in a rearward swept direction lateral to the longitudinal axis thereof with attached primary wing flaps; a pair of pivotable swept transverse wings being positioned rearwardly of and lower than the primary wings and attached to the fuselage and extending outward therefrom in a direction lateral to the longitudinal axis thereof with optional transverse wing flaps, the pivotable swept transverse wings alo being capable of being tilted on an axis which is parallel to the fuselage resulting in the raising and lowering of the transverse wingtips in addition to the pivoting characteristics of the transverse wings which allow the transverse wings to be pivoted into a canted second configuration in which the leading edge of each of the transverse wings approaches or contacts the trailing edge of the respective primary wing; transverse wing collars being provided to assure the necessary clearance between the leading edge inboard corner of the canted, tilted, and forward swept transverse wings and the fuselage; the transverse wing collars also providing suitable support for weapons or accessory mounts, or landing gear supports or landing gear wells.

It is an object of the present invention to construct an airplane with swept primary and transverse wings where the swept, tapered primary and transverse wings retain a parallel relationship, or a greater than parallel relationship during high-speed flight.

It is another object of the present invention to achieve an airplane where the swept transverse wings have a limited variable wing sweep in order to facilitate a parallel relationship between the leading edge of the transverse wings and the trailing edge of the primary wing or primary wing flaps when in the high-lift configuration.

It is yet another object of the present invention to provide an aircraft achieving the heretofore stated objectives with the use of a transverse wing collar located at the transverse wing roots and fixed to the fuselage providing necessary clearance when the swept transverse wings are both pivotable canted, laterally tilted, and forward swept into the high-lift configuration; said wing collars also providing suitable supports for weapons or accessory mounts, or landing gear supports or landing gear wells.

DESCRIPTION OF THE PREFERRED EMBODIMENT

Figure 1:
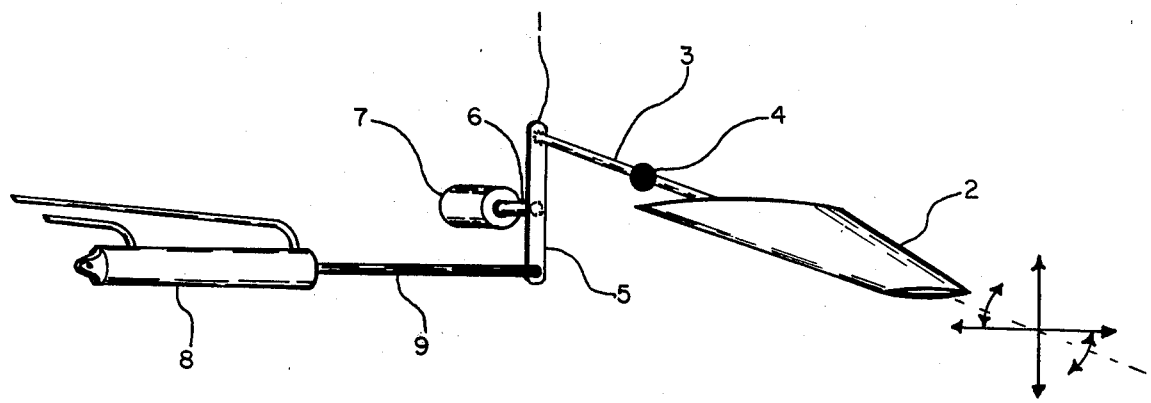
FIG. 1 is a perspective diagram of the operating apparatus of the transverse wing canting, dehedral angle tilting, and variable sweeping mechanism with the transverse wing in a high-speed position.

Shown in FIG. 1 is a transverse wing tilting mechanism with the transverse wing in high-speed configuration, generally indicated at 1. In its operation, the hydraulic piston 9 is pulled by the hydraulic cylinder 8 which tilts the transverse wing tilt lever 5 in a clockwise direction. The transverse wing tilt lever arm 6 is connected at one end to the transverse wing tilt lever 5, and to the tilt lever mounting bearing 7 at the opposite end. At the top of the transverse wing tilt lever 5 is firmly attached the transverse wing actuation arm 3. At the opposite end of the transverse wing actuation arm 3 is attached the transverse wing 2. Near the junction between the transverse wing actuation arm 3 and the transverse wing 2 on the transverse wing actuation arm 3 is located a universal movement bearing 4. The solid actuation arm 3 passes through the universal movement bearing 4 which is mounted on the fuselage of the aircraft or within the transverse wing collar. The purpose of the universal bearing 4 is to provide a fixed pivotal supporting point for movement of the actuation arm 3. Attached to the center of the transverse wing tilt lever 5 is the wing tilt lever arm 6. This wing tilt lever arm 6 is in line with the universal bearing 4 so as the transverse wing tilt lever is tilted, a twisting motion is transferred through the transverse wing actuation arm 3 resulting in canting (or tilting) of the transverse wing 2. In addition to the canting action resulting in the turning of the transverse wing on a centerline axis, it can be seen that by lowering the top of the transverse wing tilt lever 5 and transmitting this action along the transverse wing actuation arm 3 through the universal pivot bearing 4, a result is a lifting of the transverse wingtip to a higher secondary position as well as causing a forward sweeping movement of the transverse wingtip leading edge. These actions tend to result in an alignment of the leading edge of the transverse wing with the trailing edge of the primary wing or primary wing flap as the transverse wind during actuation from the high-speed configuration to the high-lift configuration approaches the trailing edge of the primary wing of the lowered primary wing flap. The advantage of this tilting mechanism is that swept transverse wings which are wider at the wing roots than at the wing tips may be mounted on the fuselage of an aircraft where the centerline of the transverse wings are in a parallel relationship to the centerline of the primary wings when viewed from a forward as well as a top view of the aircraft. This centerline parallel relationship allows for the leading edges of both sets of transverse and primary wings to have the same angle, thus enter the airstream with this same angle when in the high-speed configuration. Since the angle of the leading edge of the transverse wing is different from the angle of the trailing edge of the primary wing, or primary wing flap, the tilting mechanism compensates and corrects the transverse wings to the proper angles during actuation to the hig-lift configuration, allowing for a new parallel relationship between the leading edge of the transverse wings and the trailing edge of the primary wings or primary wings' flaps to occur as the actuated transverse wings approach or contact the primary wing or primary wing flap when in the high-lift configuration.

Figure 2:
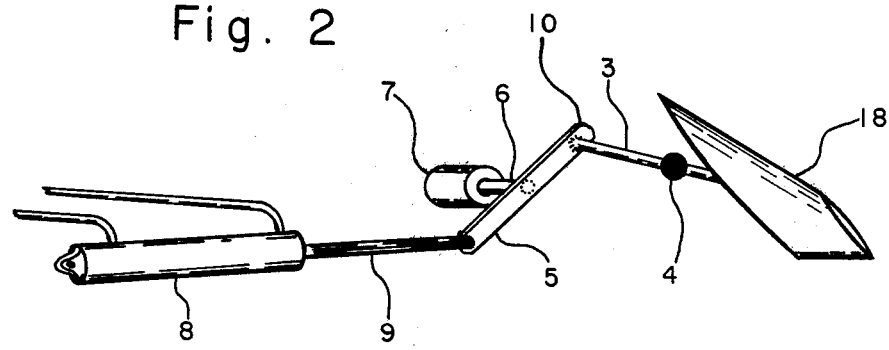
FIG. 2 is a perspective diagram of the operating apparatus of the transverse wing canting, dehedral angle tilting, and variable sweeping mechanism with the transverse wing in a high-lift position.

Shown in FIG. 2 is the transverse wing tilting mechanism with the transverse wing in high-lift configuration, generally indicated at 10. The hydraulic cylinder 8 has pulled the hydraulic piston 9 tilting the transverse wing tilt lever 5 in a clockwise direction. This has resulted in the turning of the transverse wing actuation arm 3 and the transmission of this motion through the universal pivot bearing 4 canting the transverse wing 18 into the high-lift producing configuration. In addition, the tilting of the transverse wing tilt lever 5 has caused the lowering of the top of the lever 5 resulting in the transmission of this motion with the transverse wing actuation arm through the universal pivot bearing 4 raising the wingtip of the transverse wing 18 into the high-lift producing configuration. Also, the tilting of the transverse wing tilt lever 5 has caused a rearward motion of the junction of the top of the transverse wing tilt lever 5 and the end of the transverse wing actuation arm 3 with the transmission of this motion through the universal pivot bearing 4 resulting in a forward sweeping movement of the transverse wingtip into the high-lift producing configuration.

Figure 3:
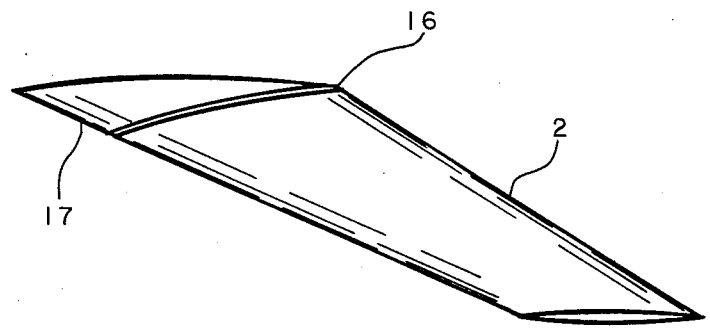
FIG. 3 is a perspective drawing of a transverse wing consisting of the transverse wing collar and transverse wing in a high-speed position.
Figure 4:
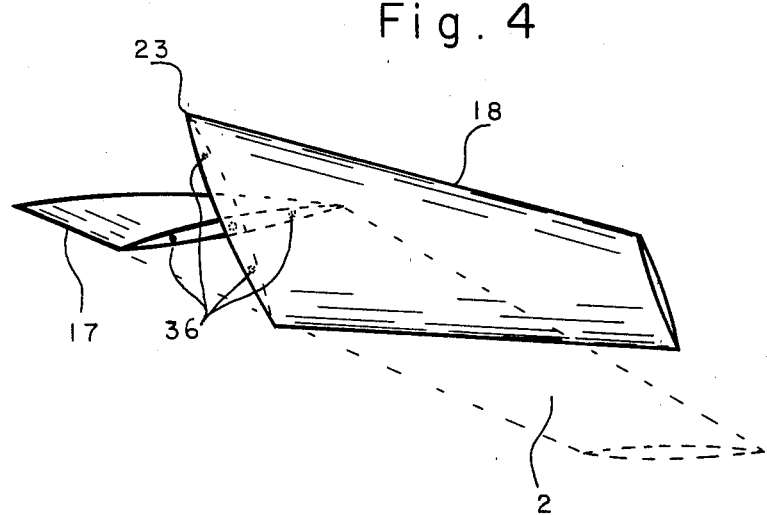
FIG. 4 is a perspective drawing of a transverse wing consisting of the ransverse wing collar and transverse wing in a high-lift position.

FIG. 3 shows a secondary transverse wing, generally indicated at 16. The rearward swept transverse wing is composed of two sections; the transverse wing collar 17 and the transverse wing 2 in its high-speed configuration. The purpose of the transverse wing collar 17 is to provide the necessary clearance between the inboard leading edge of the canted, laterally tilted, and forward sweep of the transverse wing 18 of FIG. 4 when the transverse wing is in the high-lift configuration, and the fuselage of the aircraft. As shown in FIG. 3 and 4, the transverse wing collar consists of the inboard portion of the swept transverse wing which is wider at the leading edge than it is at the trailing edge. The transverse wing collar also contains the necessary mechanisms 36 to lock the transverse wing 2 into its high-speed configuration 2.

Figure 5:
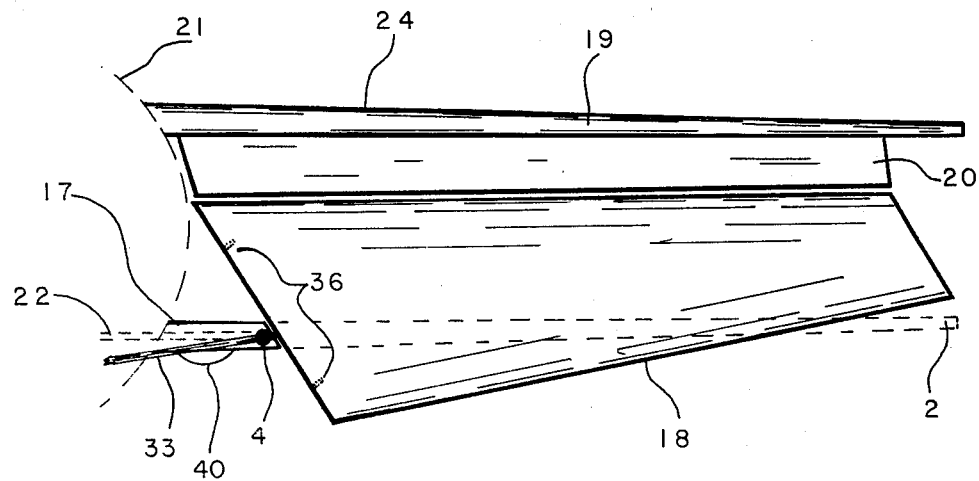
FIG. 5 is a front view drawing of a primary wing with lowered primary wing flap, transverse wing collar with accessory or landing gear pylon or support, and a tilted transverse wing possessing a canted angle, tilted dehedral angle, and forward swept angle combined in the high-lift configuration.

FIG. 5 shows the high-speed parallel relationship between the primary wing 19 and the transverse wing 2. FIG. 5 also shows the relationship between the lowered primary wing flap 20 of the primary wing 19, the canted, tilted, and forward sweep of the transverse wing when it is in the high-lift configuration 18, the transverse wing collar 17, and the aircraft fuselage 21. As indicated by FIG. 5, had the transverse wing collar not been present, the canting, tilting, and sweeping of the swept transverse wing into the high-lift configuration 18 from the high-speed configuration 2 could not occur without the inboard leading edge of the transverse wing entering the fuselage of the aircraft 21. FIG. 5 also shows the universal pivot 4 and the changing angles of the transverse wing actuation arm when it has actuated the transverse wing into the high speed configuration 22, or the high lift configuration 33. In addition, FIG. 5 shows weapons 40 or accessory pylons attached to the transverse wing collars, or landing gear supports and/or landing gear retraction wells 40 attached to the transverse wing collars.

Figure 6:
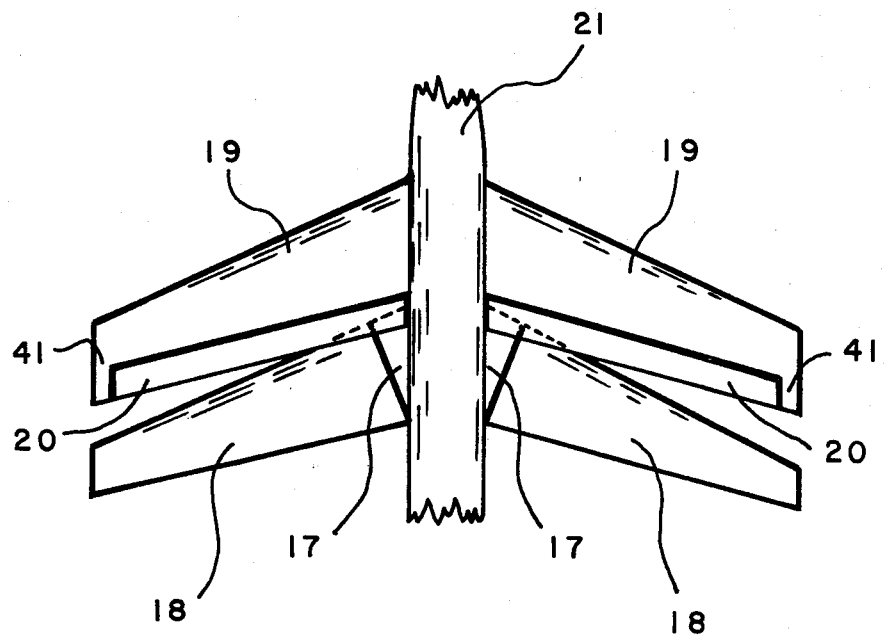
FIG. 6 is a top view drawing of an aircraft with primary wings and secondary transverse wings during the high speed flight configuration.

FIG. 6 is a top view showing the relationship between the primary and secondary or transverse wings of this aircraft when the wings are in their high speed configuration. Primary wings 19 have attached to the rear of them the primary wing flaps 20 which end before the wingtip of the wings, leaving spaces 41. The primary wings are located above and ahead of the secondary wings 18. These secondary wings are attached to the fuselage 21 of the aircraft with the transverse wing collars 17 located between the major transverse wing area surface 18 and fuselage 21. The length of the transverse wing 18 with attached collars 17 can equal the length of the primary wings 19 with spaces 41 when both sets of wings are in the high speed configuration. When in the high speed configuration, the angle of the leading edges of the tapered transverse wings 18 are substantially different from the angle of the trailing edges of the tapered primary wings 19, or primary wing flaps 20. However, the angle of the leading edges of the primary wings 19 and the angle of the leading edges of the transverse wings 18 are identical when in the high speed configuration, and the angle of the trailing edges of the primary wings 19 or primary wing flaps 20 and the trailing edge of the transverse wings 18 are identical when all the wings are in the high speed configuration.

Figure 7:
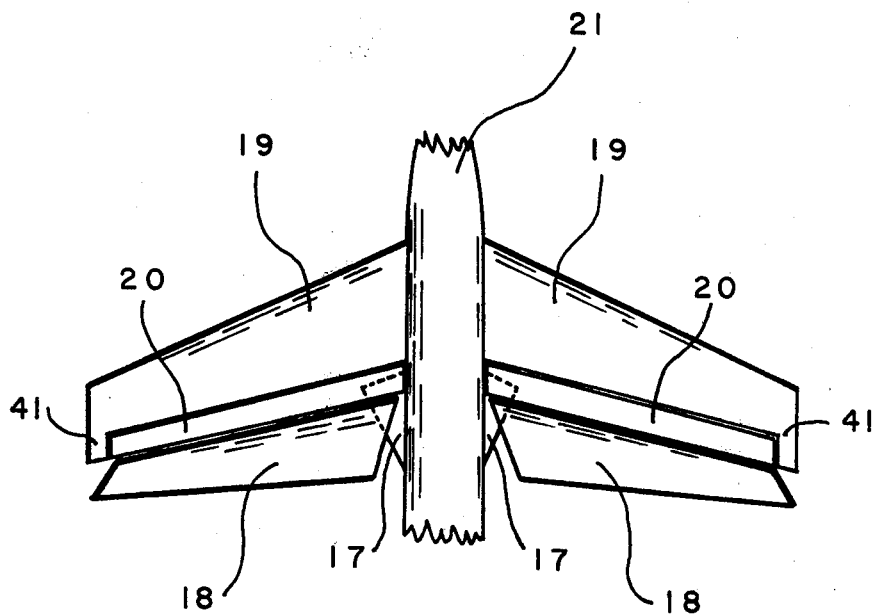
FIG. 7 is a top view drawing of an aircraft with primary wings and secondary transverse wings during the high lift flight configuration.

FIG. 7 is a top view showing the same aircraft of FIG. 6 with the transverse wings 18 tilted to their high lift configuration. When utilizing the transverse wing tilting mechanism previously discussed, the transverse wings 18 are tilted, canted, and forward swept to achieve a new relationship with the primary wings 19, or the primary wing flaps 20 which may be in a lowered position. This new relationship allows for the leading edges of transverse wings 18 to achieve a new angle; the same angle of the trailing edge of primary wings 19 or primary wing flaps 20 with the result being the creation of one highly cambered, high lift production swept airfoil from two independent high speed airfoils. With the operation of the tilting mechanism, the entire leading edge of the transverse wings 18 are moved towards fuselage 21, resulting in the obstruction free spaces as the leading edges of the transverse wings approach or meet the trailing edges of the primary wing 19 or the trailing edge of the primary wing flap 20.

It is understood that the present invention is not limited to the particular construction and arrangement of parts disclosed and illustrated hereing, but embraces all such modified forms thereof as come within the scope of the following claims.

What is claimed is:

1. What is claimed is an aircraft sustentation system comprised of a fuselage, and two sets of swept and tapered wings; the primary wings being fixed to the fuselage of the aircraft above and in front of the second set of wings, this second set being capable of remaining in a position parallel to the primary wings with the leading and trailing edges of both sets of swept, tapered wings also remaining parallel for high speed flight, the second set of wings capable of being tilted in a manner where the leading edge of the secondary wings approach the trailing edges of the primary wings in a manner to create one high lift producing airfoil from the two individual sets of wings, wherein the improvements comprise:

a means of tilting the secondary wing from the parallel high speed position to the tilted high lift position utilizing a wing tilt lever arm with a fixed and attached transverse wing support arm, a transverse wing tilt lever mounting bearing and a universal transverse wing actuation arm bearing, both bearings cooperating with each other to support the wing tilt lever and wing actuation arm as a unit during actuation of this system, and both bearings being located a distance from the junction where the wing tilt lever and the transverse wing actuation arm meet to form one unit which rotates upon a motive force from the power source, thus canting, laterally tilting, and forward sweeping the rearward swept, tapered transverse wing in a manner where the leading edge of the transverse wing approaches the trailing edge of the swept primary wing with a parallel relationship between the edges, thus forming one high lift producing airfoil.

2. An aircraft sustentation system of claim 1 wherein a portion of the trailing edge of the primary wings approached by the secondary wings are primary wing flaps.

* * * * *